US010401161B2

(12) United States Patent
Parent et al.

(10) Patent No.: US 10,401,161 B2
(45) Date of Patent: Sep. 3, 2019

(54) METHOD FOR DIMENSIONING A TURBOMACHINE

(71) Applicants: Safran Aircraft Engines, Paris (FR); ECOLE CENTRALE DE LYON, Ecully (FR); CENTRE NATIONAL DE LA RECHERCHE SCIENTIFIQUE (CNRS), Paris (FR); ECOLE NATIONALE D'INGENIEURS DE SAINT ETIENNE, Saint Etienne (FR)

(72) Inventors: Marie-Oceane Parent, Paris (FR); Fabrice Joel Luc Chevillot, Paris (FR); Fabrice Hugues Jean Pierre Thouverez, Tassin-la-Demi-Lune (FR)

(73) Assignees: SAFRAN AIRCRAFT ENGINES, Paris (FR); CENTRE NATIONAL DE LA RECHERCHE SCIENTIFIQUE (CNRS), Paris (FR); ECOLE CENTRALE DE LYON, Ecully (FR); ECOLE NATIONALE D'INGENIEURS DE SAINT ETIENNE, Saint Etienne (FR)

(*) Notice: Subject to any disclaimer, the term of this patent is extended or adjusted under 35 U.S.C. 154(b) by 395 days.

(21) Appl. No.: 15/316,484

(22) PCT Filed: Jun. 3, 2015

(86) PCT No.: PCT/FR2015/051466
§ 371 (c)(1),
(2) Date: Dec. 5, 2016

(87) PCT Pub. No.: WO2015/185857
PCT Pub. Date: Dec. 10, 2015

(65) Prior Publication Data
US 2017/0160083 A1 Jun. 8, 2017

(30) Foreign Application Priority Data

Jun. 6, 2014 (FR) ...................... 14 55190

(51) Int. Cl.
*G01B 21/04* (2006.01)
*G01B 21/22* (2006.01)
*G01B 21/32* (2006.01)
*F01D 11/14* (2006.01)
*G01B 21/24* (2006.01)

(52) U.S. Cl.
CPC .............. *G01B 21/04* (2013.01); *F01D 11/14* (2013.01); *G01B 21/22* (2013.01);
(Continued)

(58) Field of Classification Search
CPC ...... G01B 21/04; G01B 21/22; G01B 21/045; G01B 21/24; G01B 21/32; F01D 11/14; F05D 2260/81
See application file for complete search history.

(56) References Cited

U.S. PATENT DOCUMENTS

| 7,774,157 B2* | 8/2010 | Bouron | F01D 5/141 702/147 |
| 2011/0090514 A1* | 4/2011 | Robinson | F01D 5/005 356/601 |
| 2015/0158133 A1* | 6/2015 | Cheah | B23P 6/007 416/223 B |

FOREIGN PATENT DOCUMENTS

| DE | 10352790 A1 | 6/2005 |
| EP | 1890009 A2 | 2/2008 |

(Continued)

OTHER PUBLICATIONS

French Search Report with English language translation cover sheet, dated Mar. 3, 2015, FR Application No. 1455190.
(Continued)

*Primary Examiner* — Gregory J Toatley, Jr.
*Assistant Examiner* — Lynda Dinh
(74) *Attorney, Agent, or Firm* — Womble Bond Dickinson (US) LLP

(57) ABSTRACT

The present invention relates to a method for dimensioning a turbomachine comprising a casing and a disc to which at least one blade is secured, said disc being rotationally driven by a shaft about a turbomachine axis (z), comprising: —acquisition (E1) of the coordinates (P) of the ends of the leading edge and of the trailing edge of the blade in a frame of reference connected with the disc; —expression (E2) of the coordinates (P') of the ends of the leading edge and of the trailing edge of the blade in a frame of reference connected with the casing; —calculation (E3) of the distance (g) between the casing and the ends of the leading edge and trailing edge of the blade from the coordinates (P') expressed in the frame of reference connected with the casing; —calculation (E4) of the contact pressures between the blade and the casing along the end of the blade from the calculated distance (g); —calculation (E5) of the reaction forces and moments resulting from contact between the blade and the casing from the calculated pressures; —dimensioning (E6) of the turbomachine as a function of the calculated distances, pressures, forces and moments.

12 Claims, 7 Drawing Sheets

(52) U.S. Cl.
CPC .......... *F05D 2260/81* (2013.01); *G01B 21/24* (2013.01); *G01B 21/32* (2013.01)

(56) References Cited

FOREIGN PATENT DOCUMENTS

| FR | 3009589 A1 * | 8/2013 |
|----|--------------|--------|
| GB | 2483061 A    | 2/2012 |

OTHER PUBLICATIONS

International Search Report with English language translation, dated Aug. 25, 2015, PCT Application No. PCT/FR2015/051466.
Written Opinion of the International Searching Authority with English language translation, PCT Application No. PCT/FR2015/051466.

* cited by examiner

METHOD FOR DIMENSIONING A TURBOMACHINE

GENERAL TECHNICAL FIELD

The present invention relates to computer-assisted design. More precisely, it relates to a method for dimensioning a turbine engine, in particular a turbojet engine of an aircraft.

PRIOR ART

The operating performance by a turbine engine, such as a turbojet engine of an aircraft, depends mostly on the spacing between the rotating parts and the fixed parts of the turbine engine. Reducing such a spacing to a minimum, for example between the blades of the turbine engine and its casing, limits leaks and therefore in general maximizes performance of the turbine engine from a hydraulic viewpoint. However, if this spacing is minimum there is the risk of contact between the blades and the casing of the turbine engine. Such contacts, if excessive reaction forces or vibrations at inappropriate frequencies occur, may cause damage to the turbine engine. Such risks exist particularly in modern turbine engines employing both for movable and fixed parts light but flexible materials and therefore subject to deformation and vibration.

It is therefore necessary to dimension this spacing as exactly as possible to produce good performance without as such risking damaging the turbine engine or its performance due to contacts between its fixed and rotating parts.

A first category of models used for such dimensioning combines models of impellers. These models take into account the flexibility of the blades and the disc supporting them and analyze the vibratory behavior of these elements. Three-dimensional models with finished elements are used especially to finely represent the geometry of the blades and the casing around the end of the blades and estimate the contact behavior between the blades and the casing. Such models are however local and do not take into account the dynamic mechanical behavior of the rotation shaft of the turbine engine and of the rest of the latter. Also, calculation using such models consumes a large number of resources.

A second category of models used for dimensioning turbine engines combines models of rotor dynamics. Such models include modeling of all the elements of the turbine engine for analyzing the vibratory behavior of the rotor of the turbine engine. Such models do not use discretization of the geometry for limiting the number of computing resources consumed by a calculation. However, such models generally use simplified and rigid modeling of the blades and the casing of the turbine engine and consequently do not precisely calculate the contact interactions between the blades and the casing for dimensioning of the turbine engine.

There is therefore a need for a method for dimensioning a turbine engine for precisely calculating the contact interactions between the blades and the casing, and taking into account the mechanical behavior of the rotor and the vibrations and deformations of the blades, the disc and the casing, for a limited cost in computing resources.

PRESENTATION OF THE INVENTION

According to a first aspect the present invention proposes a method for dimensioning a turbine engine comprising a casing and a disc on which is fixed at least one blade, said casing enclosing the disc and the at least one blade, said disc being driven in rotation by a shaft about an axis, so called axis of the turbine engine z, and said blade comprising a leading edge BA and a trailing edge BF, said method being characterized in that it comprises performing by data-processing means steps of:
- acquisition of the coordinates P of the ends of the leading edge and of the trailing edge of the blade in a reference mark linked to the disc (Xb, Yb, Zb) as determined previously;
- from said acquired coordinates P, expression of the coordinates P' of the upper ends of the leading edge and of the trailing edge of the blade in a reference mark linked to the casing ($x_c$, $y_c$, $z_c$);
- calculation of the distance g between the casing and the ends of the leading edge and of the trailing edge of the blade from the coordinates P' of the ends of the leading edge and of the trailing edge of the blade in the reference mark linked to the casing ($x_c$, $y_c$, $z_c$);
- calculation of the normal and tangential contact pressures between the blade and the casing along the end of the blade from the calculated distance g;
- calculation of the normal and tangential reaction forces and the normal and tangential moments of reaction resulting from the contact between the blade and the casing from the calculated pressures;
- dimensioning of the turbine engine as a function of the calculated distances, pressures, forces and moments.

Such a method dimensions the turbine engine from precise calculation of the associated possibilities of contacts and reactions without having to use local fine and costly modeling, such as 3D modeling with finished elements.

The coordinates of the ends of the leading edge and of the trailing edge of the blade in the reference mark linked to the casing ($x_c$, $y_c$, $z_c$) may be expressed as a function of degrees of freedom of the disc, the casing and the blade.

These degrees of freedom may be from among translations and tilting movements of the disc and of the casing, deflection of the blade at its tip and radial deformation of the casing.

More precisely, these degrees of freedom may be from among:
- translations of the disc by a first length $x_d(t)$ and by a second length $y_d(t)$ along two axes (x, y) transverse to the axis of the turbine engine z, the two transverse axes (x,y) and the axis of the turbine engine z defining a first reference mark (x, y, z) linked to the shaft;
- tilting of the disc at a first angle $\varphi_{xd}(t)$ around the first axis of the first reference mark x, a second reference mark ($x_1$, $y_1$, $z_1$) being obtained by rotation of the first reference mark (x, y, z) of the first angle $\varphi_{xd}(t)$ around the first axis of the first reference mark x;
- tilting of the disc at a second angle $\varphi_{yd}(t)$ around the second axis of the second reference mark $y_1$, a third reference mark ($x_2$, $y_2$, $z_2$) being obtained by rotation of the second reference mark ($x_1$, $y_1$, $z_1$) of the second angle $\varphi_{yd}(t)$ around the second axis of the second reference mark $y_1$;
- angular positioning of the blade relative to the second axis of the third reference mark $y_2$, said angular positioning corresponding to rotation at a third angle around the third axis of the third reference mark $z_2$, the reference mark linked to the disc (Xb, Yb, Zb) forming a fourth reference mark obtained by rotation of the third reference mark ($x_2$, $y_2$, $z_2$) of the third angle around the third axis of the third reference mark $z_2$;
- deflection of the blade at its tip by a third length $x_b(t)$ along a first axis $x_b$ of a fifth reference mark ($x_b,y_b,z_b$) obtained by rotation of the fourth reference mark (Xb, Yb, Zb) of a fourth angle β around the second axis of the fourth reference mark Yb;

translations of the casing by a fourth length Mt) and by a fifth length $y_c(t)$ along the two first axes of the first reference mark (x,y);

tilting of the casing by a fifth angle $\varphi_{xc}(t)$ around the first axis of the first reference mark x, a sixth reference mark $(x_{c1}, y_{c1}, z_{c1})$ being obtained by rotation of the first reference mark (x, y, z) of the fifth angle $\varphi_{xc}(t)$ around the first axis of the first reference mark x;

tilting of the casing by a sixth angle $\varphi_{yc}(t)$ around the second axis of the first reference mark y, the reference mark $(x_c, y_c, z_c)$ linked to the casing being obtained by rotation of the sixth reference mark $(x_{c1}, z_{c1})$ of the sixth angle $\varphi_{yc}(t)$ around the second axis of the first reference mark y;

radial deformation of the casing by a sixth length $u(\alpha,t)$ relative to a radius of the casing Rc.

In this way, the three-dimensional (3D) kinematics of all of the elements of the turbine engine may be taken into account for precise calculation of contact possibilities between each blade and the casing.

The coordinates P' of the ends of the leading edge and of the trailing edge of the blade expressed in the reference mark linked to the casing $(x_c, y_c, z_c)$ may be expressed by means of the following formula:

$$P' = P_{\phi_{y_c}} P_{\phi_{x_c}} \left( P_{\phi_{x_d}}^T P_{\phi_{y_d}}^T P_{\alpha_j}^T \left( P + P_\beta^T \begin{Bmatrix} x_b(t) \\ 0 \\ 0 \end{Bmatrix} \right) + \begin{Bmatrix} x_d(t) - x_c(t) \\ y_d(t) - y_c(t) \\ 0 \end{Bmatrix} \right)$$

with:

$P\varphi_{xd}$ the transformation matrix from the first reference mark (x, y, z) to the second reference mark $(x_1, y_1, z_1)$, $P\varphi_{yd}$ the transformation matrix from the second reference mark $(x_1, y_1, z_1)$ to the third reference mark $(x_2, y_2, z_2)$, $P\varphi_{xc}$ the transformation matrix from the first reference mark (x, y, z) to the sixth reference mark $(x_{c1}, y_{c1}, z_{c1})$ and $P\varphi_{yc}$ the transformation matrix from the sixth reference mark $(x_{c1}, y_{c1}, z_{c1})$ to the reference mark linked to the casing $(x_c, y_c, z_c)$, Pαj the transformation matrix linked to the angular positioning of the blade on the disc, Pβ the transformation matrix linked to the orientation of the deflection of the blade at its tip, and, $$P_{\alpha_j} = \begin{bmatrix} \cos\alpha_j & \sin\alpha_j & 0 \\ -\sin\alpha_j & \cos\alpha_j & 0 \\ 0 & 0 & 1 \end{bmatrix}; P_\beta = \begin{bmatrix} \cos\beta & 0 & -\sin\beta \\ 0 & 1 & 0 \\ \sin\beta & 0 & \cos\beta \end{bmatrix}$$

$$P_{\phi_{x_d}} = \begin{bmatrix} 1 & 0 & 0 \\ 0 & \cos\phi_{x_d} & \sin\phi_{x_d} \\ 0 & -\sin\phi_{x_d} & \cos\phi_{x_d} \end{bmatrix}; P_{\phi_{y_d}} = \begin{bmatrix} \cos\phi_{y_d} & 0 & -\sin\phi_{y_d} \\ 0 & 1 & 0 \\ \sin\phi_{y_d} & 0 & \cos\phi_{y_d} \end{bmatrix}$$

$$P_{\phi_{x_c}} = \begin{bmatrix} 1 & 0 & 0 \\ 0 & \cos\phi_{x_c} & \sin\phi_{x_c} \\ 0 & -\sin\phi_{x_c} & \cos\phi_{x_c} \end{bmatrix}; P_{\phi_{y_c}} = \begin{bmatrix} \cos\phi_{y_c} & 0 & -\sin\phi_{y_c} \\ 0 & 1 & 0 \\ \sin\phi_{y_c} & 0 & \cos\phi_{y_c} \end{bmatrix}$$

This creates a direct relation between the position of the end of a given blade by its 3D geometry and the position of this same end in the reference mark linked to the casing. Calculation of the clearance between the casing and the end of the blade is reduced to calculation of minimum distance between a point and the internal surface of the casing defined in the same reference mark.

The internal surface of the casing being considered to form a circular cone of angle θ, base radius Rb and height h, the distance g between the casing and the ends of the leading edge and of the trailing edge of the blade may be calculated by means of the following formula:

$$g(P) = \left( -\frac{R_b}{h} P'_z + R_b - \sqrt{P'^2_x + P'^2_y} + u(\alpha(P), t) \right) \cos\theta$$

with $$P' = \{P'_x, P'_y, P'_z\}^T$$

Calculation of the clearance between the casing and the end of the blade is reduced to calculation of minimum distance between a point and a cone in the reference mark linked to the casing. The expression of this distance is directly a function of the coordinates of the ends of each blade P deduced from the 3D geometry of the turbine engine and its calculation therefore does not need resolution of an additional intermediate equation. The calculation times need to determine this distance is now reduced.

Calculation of pressures may perform a shaping function adapted to the end of the blade and to the profile of initial clearance. Such a variant considers the 3D geometry of the end of the contact area without need for discretization.

The contact pressures may be calculated along a cord assumed to be rectilinear of length lc forming an end of the blade by a linear interpolation from the calculated distances between the casing and the upper ends of the leading edge and of the trailing edge of the blade.

The normal $p_N$ and tangential $p_T$ contact pressures at any point of said cord may be calculated by means of the following formulas:

$$p_N(c) = \frac{k_r}{l_c}(\zeta c + \eta) \text{ and } p_T(c) = \frac{k_t}{l_c}(\zeta c + \eta)$$

$$avec\, \zeta = \frac{g(BF) - g(BA)}{l_c}$$

$$et\, \eta = \frac{g(BF) - g(BA)}{2}$$

c representing the abscissa of a position along said cord varying between lc/2 and +lc/2 and, $k_r$ and $k_t$ being the normal and tangential degrees of stiffness on contact.

The normal $F_N$ and tangential $F_T$ reaction forces and the normal $M_N$ and tangential $M_T$ moments of reaction resulting from the contact between a blade and the casing may be calculated by means of the following formulas:

$$F_N = \int_{c1}^{c2} p_N(c)dc \quad F_T = \int_{c1}^{c2} p_T(c)dc \quad M_N = \int_{c1}^{c2} c\, p_N(c)dc$$
$$M_T = \int_{c1}^{c2} c\, p_N(c)dc$$

c1 and c2 being the minimum and maximum abscissae of all the positions of the cord of the blade in contact with the casing.

This calculates the contact reactions: forces and moments, from distribution of pressures on a blade tip and thus considering the evolution of the contact area between a blade and the casing.

According to a second aspect, the invention relates to a computer program product comprising code instructions for executing a method for dimensioning according to the first aspect when this program is executed by a processor.

According to a third aspect, the invention relates to a device for dimensioning a turbine engine characterized in that it comprises data-processing means comprising:
- a module for acquiring the coordinates P of the ends of a leading edge BA and a trailing edge BF of a blade of a turbine engine in a reference mark linked to a disc of the turbine engine (Xb, Yb, Zb) determined previously, said turbine engine comprising a casing and said disc on which is fixed at least said blade, said casing enclosing the disc and the at least one blade, said disc being driven in rotation by a shaft about an axis, so-called axis of the turbine engine z;
- a module for expressing the coordinates P' of the upper ends of the leading edge and of the trailing edge of the blade in a reference mark linked to the casing ($x_c$, $y_c$, $z_c$) from said acquired coordinates P;
- a module for calculating the distance g between the casing and the ends of the leading edge and of the trailing edge of the blade from the coordinates P' of the ends of the leading edge and of the trailing edge of the blade in the reference mark linked to the casing ($x_c$, $y_c$, $z_c$);
- a module for calculating the normal and tangential contact pressures between the blade and the casing along the end of the blade from the calculated distance g;
- a module for calculating the normal and tangential reaction forces and normal and tangential moments of reaction resulting from the contact between the blade and the casing from the calculated pressures;
- a module for dimensioning the turbine engine as a function of the calculated distances, pressures, forces and moments.

Such computer program product and processing means have the same advantages as those mentioned for the method according to the first aspect.

PRESENTATION OF THE FIGURES

Other characteristics and advantages of the present invention will emerge from the following description of a preferred embodiment. This description will be given in reference to the appended drawings, in which.

DETAILED DESCRIPTION

Figure 1:
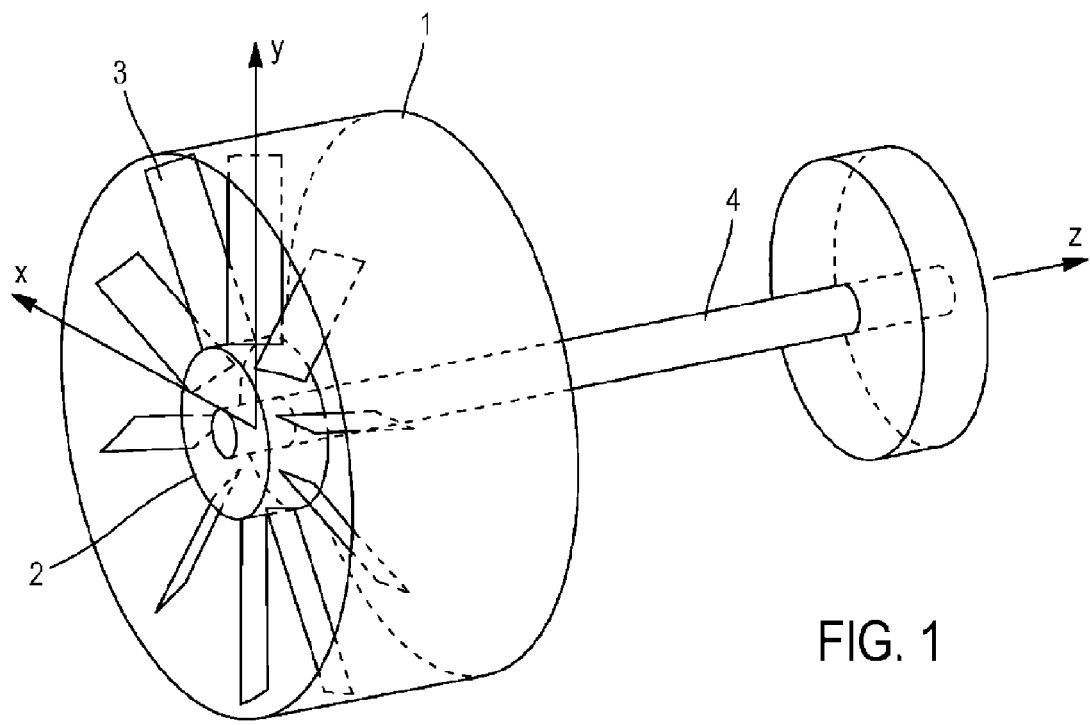
FIG. 1 illustrates an example of a turbine engine for which the method according to the invention is performed.

The present invention relates to an implementation of a method for dimensioning a turbine engine, such as shown in FIG. 1, comprising a casing 1 and a disc 2 on which is fixed at least one blade 3, the casing enclosing the disc and the blades. The disc and the blades are driven in rotation about an axis z, so-called axis of the turbine engine, by a shaft 4 extending longitudinally along the axis z. The first reference mark (x,y,z) shown in FIG. 1, whereof the two first axes x and y are transverse to the axis of the turbine engine z, is a rotating reference mark linked to the shaft 4.

The present method is preferably intended for dimensioning a turbojet engine of an aircraft but it is neither to this type of turbine engine nor the field of jet engines. This method may be implemented for dimensioning any rotating machine comprising blades in rotation inside a casing, such as turbines for production of electricity by water, gas, steam, fans etc. . . .

Figure 2:
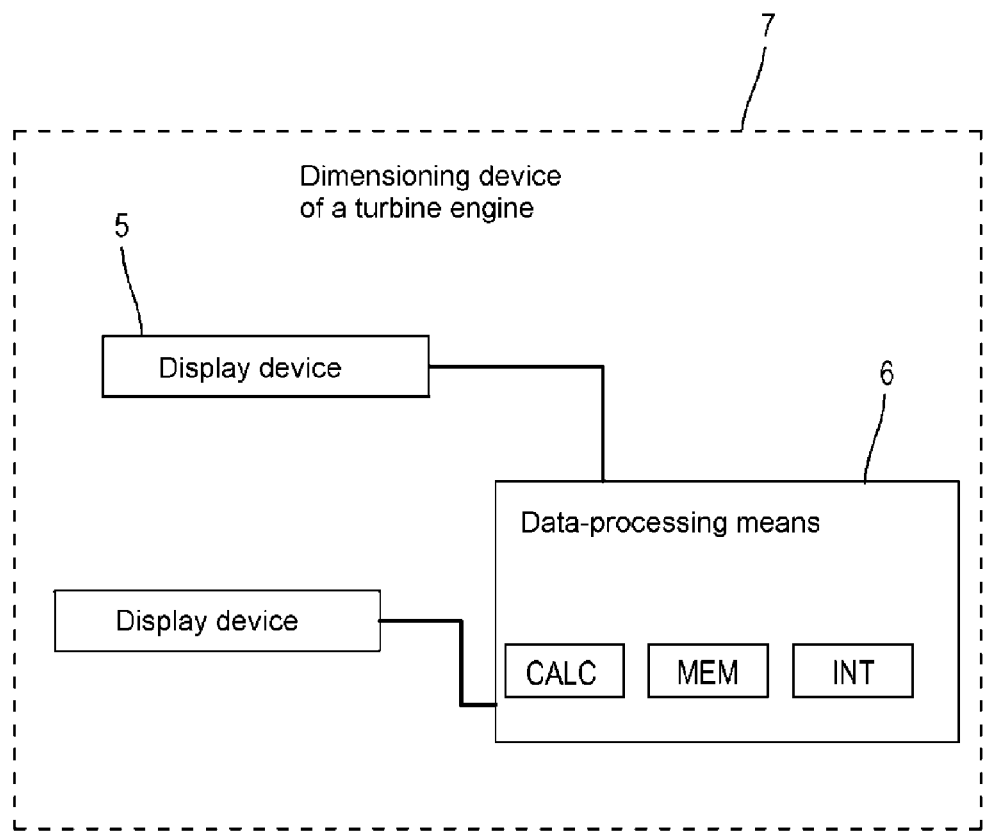
FIG. 2 illustrates data-processing means for performing the method according to the invention.

It is also intended to be performed by a device for dimensioning a turbine engine 7 comprising data-processing means 6 shown in FIG. 2, comprising calculation means CALC (computer), storage means MEM (memory), an input interface INT and at least one display device 5. Such processing means may be controlled by one operator.

Figures 3A, 3B:
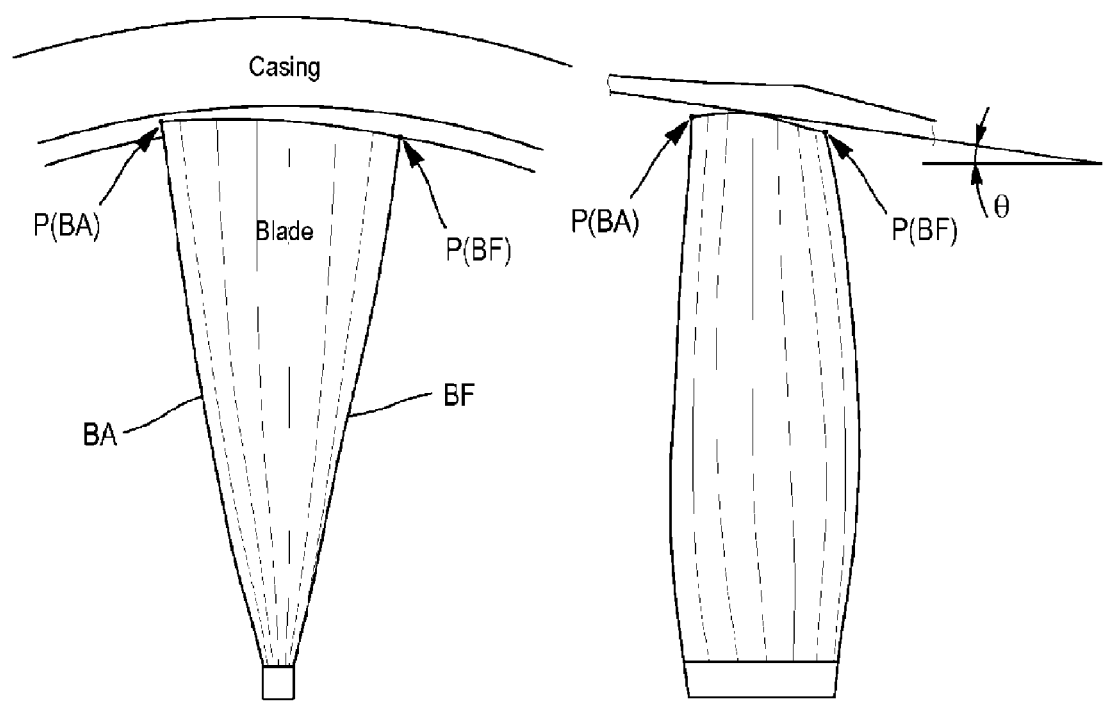
FIGS. 3a and 3b illustrate an example of a turbine engine blade represented respectively in a frontal view and in a profile view for which the method according to the invention is performed.
Figure 4:
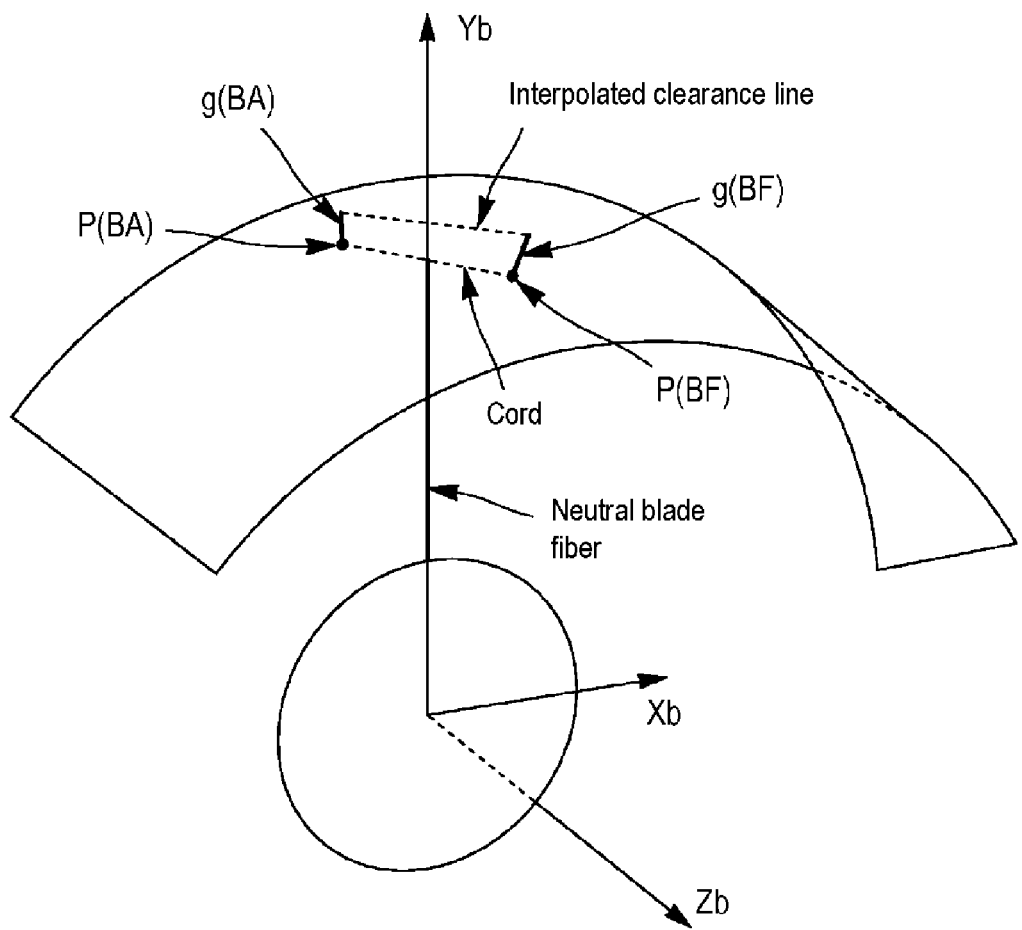
FIG. 4 represents an example of illustrating a turbine engine blade for which the method according to the invention is performed in the reference mark linked to the disc (Xb, Yb, Zb)
Figure 11:
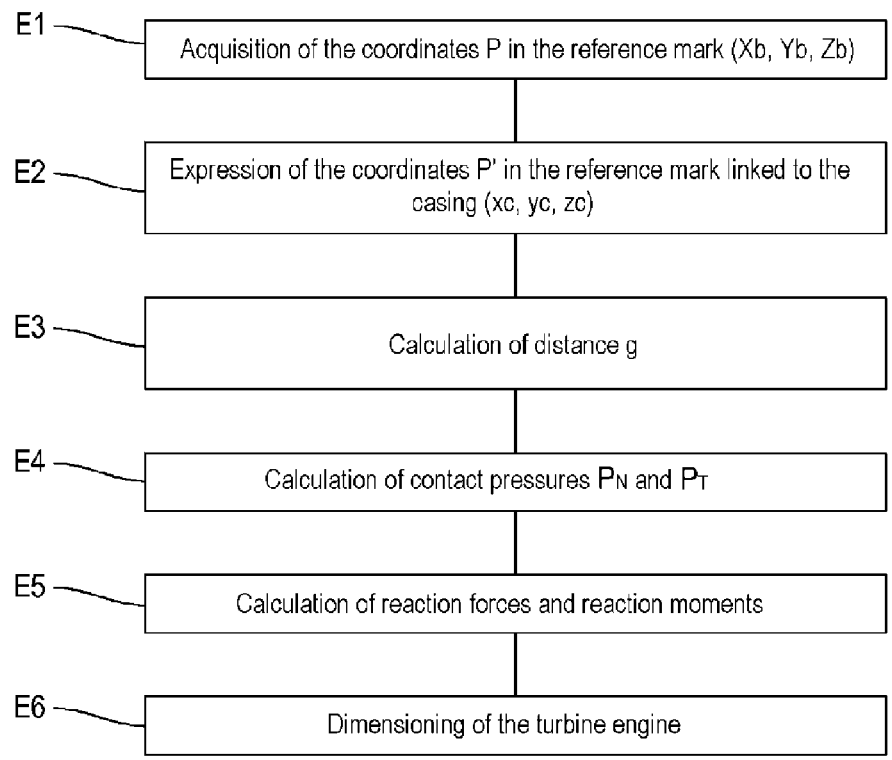
FIG. 11 is a diagram showing an implementation of a method for dimensioning according to the invention.

A turbine engine blade, represented in frontal view in FIG. 3a and in profile view in FIG. 3b, has a leading edge BA and a trailing edge BF. With (Xb, Yb, Zb) as the reference mark linked to the disc in which this blade is substantially vertical, i.e., such that the neutral fiber of the blade is aligned with the axis Yb, such as shown in FIG. 4, the coordinates of the ends at the blade tip of the leading edge and of the trailing edge of the blade in this reference mark are noted $P_{BA}$ and $P_{BF}$. In the following paragraphs, the notation P will be reference respectively for $P_{BA}$ and $P_{BF}$ when the processed point is respectively the end of the leading edge and the end of the trailing edge. These coordinates are acquired by the data-processing means 6 after having been determined previously from the three dimensional geometry (3D) of the turbine engine during a first acquisition step of coordinates E1, such as shown in FIG. 11.

According to an embodiment, the method then proposes:
- expression, from the acquired coordinates P, the coordinates P' of the upper ends of the leading edge and of the trailing edge of the blade in a reference mark linked to the casing ($x_c$, $y_c$, $z_c$),
- calculation of the distance g between the casing and the ends of the leading edge and of the trailing edge of the blade, from the coordinates $F_{BA}$ and $F_{BF}$ of the ends of the leading edge and of the trailing edge of the blade in the reference mark linked to the casing ($x_c$, $y_c$, $z_c$),
- calculation of the normal $p_N$ and tangential $p_T$ contact pressures between the blade and the casing along the end of the blade from the calculated distance g,
- calculation of the normal $F_N$ and tangential $F_T$ reaction forces and the normal $M_N$ and tangential $M_T$ moments of reaction resulting from the contact between the blade and the casing from the calculated pressures $p_N$ and $P_T$,
- dimensioning of the turbine engine as a function of the calculated distances, pressures, force and moment.

The coordinates of the ends of the leading edge and of the trailing edge of the blade in the reference mark linked to the casing ($x_c$, $y_c$, $z_c$) may be expressed as a function of a large number of degrees of freedom of elements of the turbine engine including the disc, the casing and the blades relative to the rotating reference mark (x,y,z) shown in FIG. 1. These degrees of freedom may be selected from among translations and tilting movements of the disc and of the casing, deflection of the blade at its tip and radial deformation of the casing.

It is now possible to dimension the rotating machine with precise calculation of the spacing between the blade ends and the casing, as well as interactions in case of contact, given the 3D kinematics of all of the elements of the turbine engine, without having to use local fine and costly modeling, such as 3D modeling with finished elements.

Figure 5:
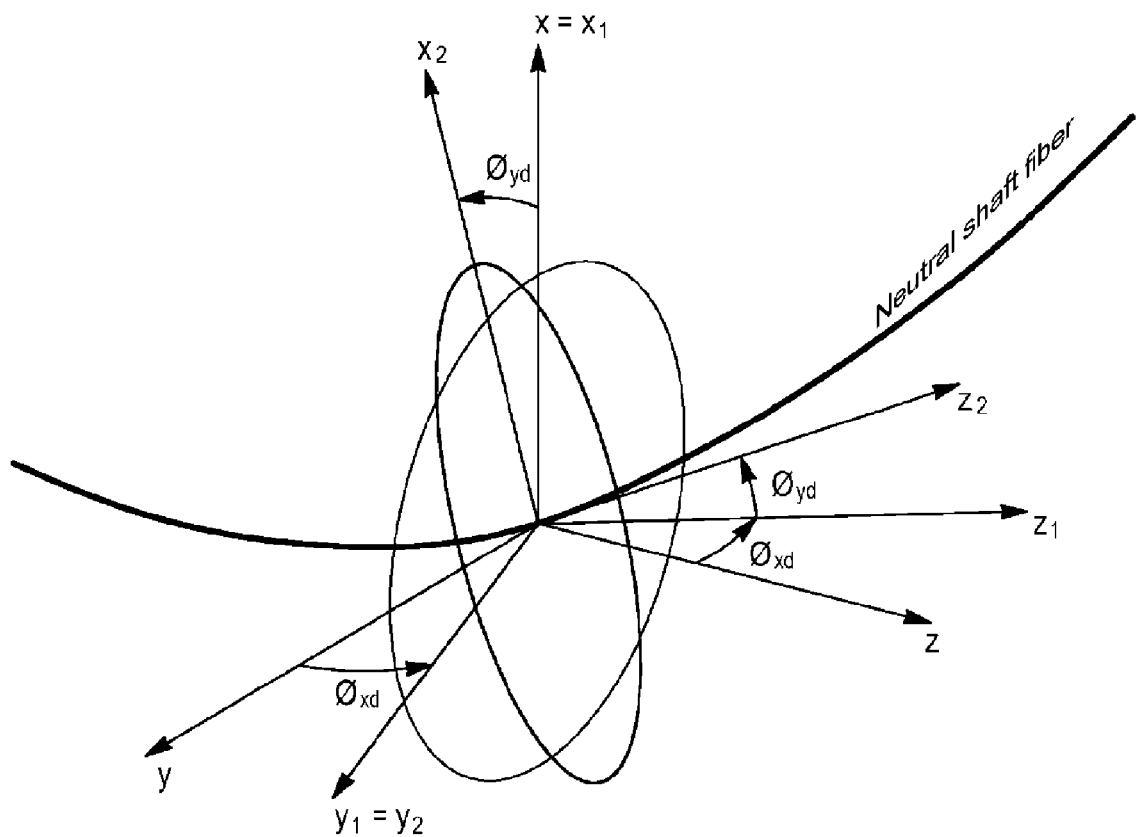
FIGS. 5 to 9 illustrate the movements of the different elements of the turbine engine considered for expressing the coordinates P' of the ends of the leading edge and of the trailing edge of the blade in a reference mark linked to the casing and represent the associated different reference marks used.
Figure 6:
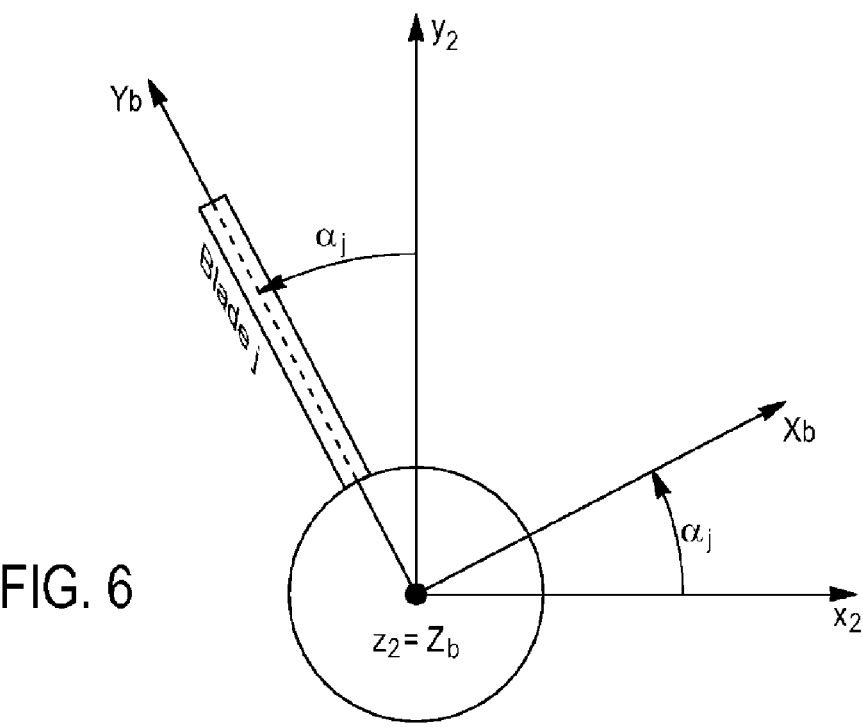
Figure 7:
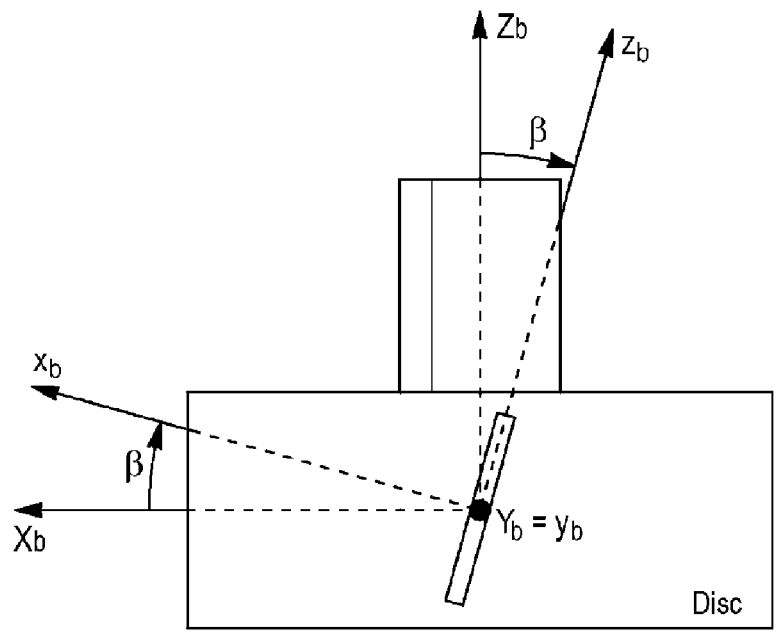
Figure 8:
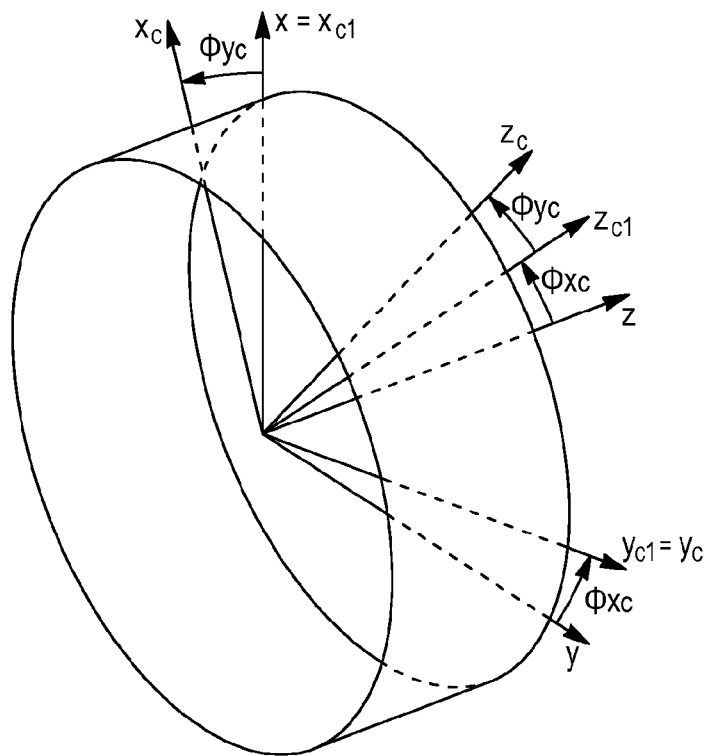
Figure 9:
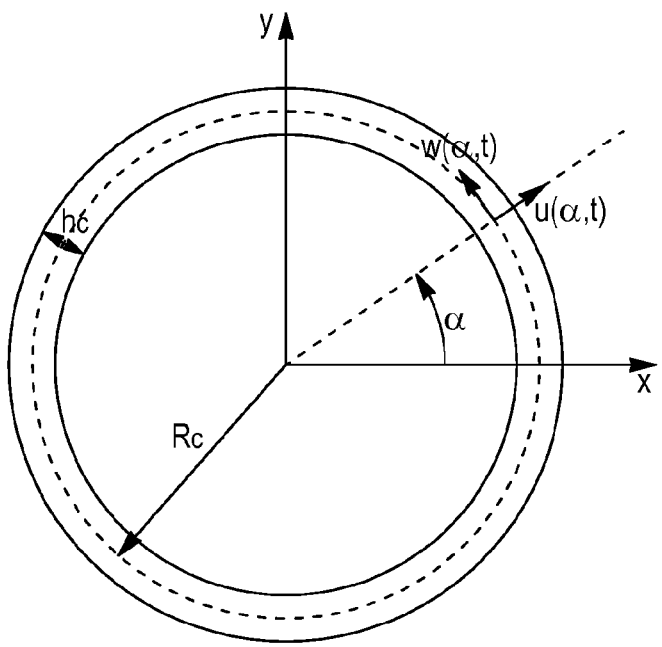

More precisely, during a second step of expression of coordinates E2, the coordinates P' of the ends of the leading edge and of the trailing edge of the blade are expressed in a reference mark linked to the casing ($x_c$, $y_c$, $z_c$) given movements of elements of the turbine engine from the following degrees of freedom of the elements of the turbine engine:

- translations of the disc by a first length $x_d(t)$ and by a second length $y_d(t)$ along the two first axes x and y of the first reference mark (x, y, z);
- tilting of the disc at a first angle $\varphi_{xd}(t)$ around the first axis of the first reference mark x, a second reference mark ($x_1$, $y_1$, $z_1$) being obtained by rotation of the first reference mark (x, y, z) of the first angle $\varphi_{xd}(t)$ around the first axis of the first reference mark x, such as shown in FIG. 5;
- tilting of the disc at a second angle $\varphi_{yd}(t)$ around the second axis of the second reference mark $y_1$, a third reference mark ($x_2$, $y_2$, $z_2$) being obtained by rotation of the second reference mark ($x_1$, $y_1$, $z_1$) of the second angle $\varphi_{yd}(t)$ around the second axis of the second reference mark $y_1$ such as shown in FIG. 5;
- angular positioning of the blade relative to the second axis of the third reference mark $y_2$, said angular positioning corresponding to rotation at a third angle $\alpha_j$ around the third axis of the third reference mark $z_2$, the reference mark linked to the disc (Xb, Yb, Zb) forming a fourth reference mark obtained by rotation of the third reference mark ($x_2$, $y_2$, $z_2$) of the third angle $\alpha_j$ around the third axis of the third reference mark $z_2$ such as shown in FIG. 6;
- deflection of the blade at its tip by a third length $x_b(t)$ along a first axis $x_b$ of a fifth reference mark ($x_b, y_b, z_b$) obtained by rotation of the fourth reference mark (Xb, Yb, Zb) of a fourth angle β around the second axis of the fourth reference mark Yb such as shown in FIG. 7;
- translations of the casing by a fourth length $x_c(t)$ and by a fifth length $y_c(t)$ along the two first axes of the first reference mark x and y;
- tilting of the casing by a fifth angle $\varphi_{xc}(t)$ around the first axis of the first reference mark x, a sixth reference mark ($x_{c1}$, $y_{c1}$, $z_{c1}$) being obtained by rotation of the first reference mark (x, y, z) of the fifth angle $\varphi_{xc}(t)$ around the first axis of the first reference mark x y such as shown in FIG. 8;
- tilting of the casing by a sixth angle $\varphi_{yc}(t)$ around the second axis of the first reference mark y, the reference mark ($x_c$, $y_c$, $z_c$) linked to the casing being obtained by rotation of the sixth reference mark ($x_{c1}$, $y_{c1}$, $z_{c1}$) of the sixth angle $\varphi_{yc}(t)$ around the second axis of the first reference mark y such as shown in FIG. 8;
- radial deformation of the casing by a sixth length $u(\alpha,t)$ relative to the radius of the casing Rc such as shown in FIG. 9.

Tangential deformation of the casing $w(\alpha,t)$ is overlooked. Also, the casing is considered in its cross-section as an inextensible elastic ring. The effect of the thickness of the casing hc on deformations of its internal surface is overlooked.

In this way, the coordinates P' of the ends of the leading edge and of the trailing edge of the blade may be expressed in the reference mark linked to the casing ($x_c$, $y_c$, $z_c$) by the following formula:

$$P' = P_{\phi_{y_c}} P_{\phi_{x_c}} \left( P_{\phi_{x_d}}^T P_{\phi_{y_d}}^T P_{\alpha_j}^T \left( P + P_{\beta}^T \begin{Bmatrix} x_b(t) \\ 0 \\ 0 \end{Bmatrix} \right) + \begin{Bmatrix} x_d(t) - x_c(t) \\ y_d(t) - y_c(t) \\ 0 \end{Bmatrix} \right)$$

With:
$P\varphi_{xd}$ the transformation matrix from the first reference mark (x, y, z) to the second reference mark ($x_1$, $y_1$, $z_1$), $P\varphi_{yd}$ the transformation matrix from the second reference mark ($x_1$, $y_1$, $z_1$) to the third reference mark ($x_2$, $y_2$, $z_2$), $P\varphi_{xc}$ the transformation matrix from the first reference mark (x, y, z) to the sixth reference mark ($x_{c1}$, $y_{c1}$, $z_{c1}$) and $P\varphi_{yc}$ the transformation matrix from the sixth reference mark ($x_{c1}$, $y_{c1}$, $z_{c1}$) to the reference mark linked to the casing ($x_c$, $y_c$, $z_c$),
P$\alpha$j the transformation matrix linked to the angular positioning of the blade on the disc,
Pβ the transformation matrix linked to the orientation of the deflection of the blade at its tip.

The transformation matrices may be defined as follows:

$$P_{\alpha_j} = \begin{bmatrix} \cos\alpha_j & \sin\alpha_j & 0 \\ -\sin\alpha_j & \cos\alpha_j & 0 \\ 0 & 0 & 1 \end{bmatrix}; P_{\beta} = \begin{bmatrix} \cos\beta & 0 & -\sin\beta \\ 0 & 1 & 0 \\ \sin\beta & 0 & \cos\beta \end{bmatrix}$$

$$P_{\phi_{x_d}} = \begin{bmatrix} 1 & 0 & 0 \\ 0 & \cos\phi_{x_d} & \sin\phi_{x_d} \\ 0 & -\sin\phi_{x_d} & \cos\phi_{x_d} \end{bmatrix}; P_{\phi_{y_d}} = \begin{bmatrix} \cos\phi_{y_d} & 0 & -\sin\phi_{y_d} \\ 0 & 1 & 0 \\ \sin\phi_{y_d} & 0 & \cos\phi_{y_d} \end{bmatrix}$$

$$P_{\phi_{x_c}} = \begin{bmatrix} 1 & 0 & 0 \\ 0 & \cos\phi_{x_c} & \sin\phi_{x_c} \\ 0 & -\sin\phi_{x_c} & \cos\phi_{x_c} \end{bmatrix}; P_{\phi_{y_c}} = \begin{bmatrix} \cos\phi_{y_c} & 0 & -\sin\phi_{y_c} \\ 0 & 1 & 0 \\ \sin\phi_{y_c} & 0 & \cos\phi_{y_c} \end{bmatrix}$$

During a first calculation step E3, the distance between the casing and the ends of the leading edge and of the trailing edge of the blade is calculated. Supposing that the internal surface of the casing forms a circular cone of angle θ, base radius Rb and height h acquired during acquisition of coordinates P of the ends of the leading edge, said cone being shown in FIG. 3, this distance may be expressed from the coordinates P according to the following formula:

$$g(P) = \left( -\frac{R_b}{h} P'_z + R_b - \sqrt{P'^2_x + P'^2_y} + u(\alpha(P), t) \right) \cos\theta$$

with $$P' = \{P'_x, P'_y, P'_z\}^T$$

Expression of the coordinates of the ends of the leading and trailing edges of the blade in the reference mark linked to the casing ($x_c$, $y_c$, $z_c$) shown in FIG. 8 now transforms calculation of the clearance between a blade and the casing in a simple distance calculation between a point and cone in a reference mark.

The modeling implemented here precisely calculates the distance between the ends of each blade and the casing, given a large number of degrees of freedom of all of the elements of the turbine engine, without as such having to resort to costly discretization such as a model with finished elements. The expression of this distance is directly a function of the coordinates of the ends of each blade P deduced from the 3D geometry of the turbine engine and its calculation therefore needs no resolution of an additional intermediate equation. The calculation time necessary for determining this distance is now reduced.

During a second calculation step E4, in case of contact between a blade and the casing, normal and tangential contact pressures may be calculated along the end of the blade from the distances calculated during the first calculation step E3.

A shaping function adapted to the end of the blade and the profile of initial clearance may be used to precisely determine distances between the blade and the casing at any point of the cord of the blade, as well as associated contact pressures. This profile of initial clearance may be determined from the shape of the end of the blade and of the shape of the internal surface of the casing facing this end, during the first acquisition step E1, from the three-dimensional (3D) geometry of the turbine engine.

Figures 10A, 10B:
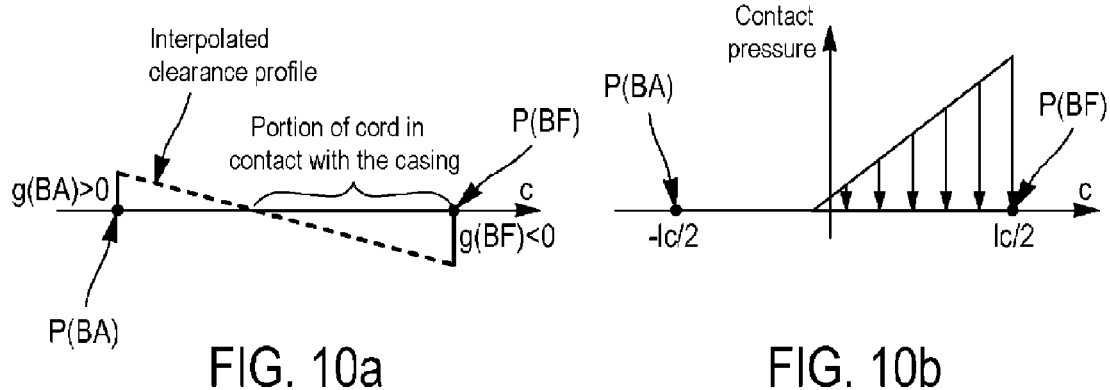
FIGS. 10a and 10b illustrate calculation of the distances between the end of the blade and the casing as well as pressures at any point of a rectilinear cord forming the end of the blade by linear interpolation.

In a first variant, the shaping function used may be linear. The distance between the end of the blade and the casing may be achieved at any point of a rectilinear cord of length lc forming the upper end of the blade by linear interpolation from the distances calculated at the leading edge and the trailing edge, as shown in FIG. 10a, and the normal $p_N$ and tangential $p_T$ pressures at any point of this cord may be expressed by the following formulas:

$$p_N(c) = \frac{k_r}{l_c}(\zeta c + \eta) \text{ and } p_T(c) = \frac{k_t}{l_c}(\zeta c + \eta)$$

$$avec\ \zeta = \frac{g(BF) - g(BA)}{l_c}$$

$$et\ \eta = \frac{g(BF) - g(BA)}{2}$$

c varying along the cord between $-lc/2$ and $+lc/2$, $k_r$ and $k_t$ being the normal and tangential degrees of stiffness on contact, $\eta$ representing the average distance between the blade and the casing, and $\zeta c+\eta$ representing the spread between the blade and the casing at the position c of the cord obtained by linear interpolation.

In those positions for which the distance between the blade and the casing is positive, corresponding to an absence of contact, the normal and tangential pressures to be taken into account are zero, as shown in FIG. 10b.

Alternatively, a shaping function more realistically representing the shape of the end of the blade and of the profile of initial clearance may be used to precisely determine the distances between the blade and the casing at any point of the cord of a blade whereof the end and the profile of initial clearance is not rectilinear, as well as associated contact pressures. By way of example, a polynomial shaping function may be employed, for example of the order of 2 in the form $W(c)=(a_2{}^*c^2+a_1{}^*c+a0)$ or of order 3 in the form $W(c)=(a_3{}^*c^3+a_2{}^*c^2+a_1{}^*c+a_0)$, the coefficients a0, a1, a2 and a3 being dependent on the clearances calculated at the ends of the leading edge and of the trailing edge of the blade and of the profile of initial clearance defined during the first acquisition step E1. The normal and tangential contact pressures between the blade and the casing may be expressed as a function of such a shaping function according to the following expressions:

$$p_N(c) = \frac{k_r}{l_c}W(c) \text{ and } p_T(c) = \frac{k_t}{l_c}W(c).$$

In this way, the contact pressures may be calculated at any point of the end of the blade in case of contact with the casing, given the 3D geometry of the contact area, without having to discretize the geometry of the blade or use oversimplified geometry not representative of the real geometry of the blade.

During a third calculation step E5, the normal $F_N$ and tangential $F_T$ reaction forces and the normal $M_N$ and tangential $M_T$ moments of reaction resulting from the contact between a blade and the casing are calculated. They may be expressed by means of the following formulas:

$$F_N = \int_{c1}^{c2} p_N(c)dc\ \ F_T = \int_{c1}^{c2} p_T(c)dc\ \ M_N = \int_{c1}^{c2} c\ p_N(c)dc$$
$$M_T = \int_{c1}^{c2} c\ p_N(c)dc$$

with c1 and c2 defining the contact limits between the blade and the casing:
- c1=$-lc/2$ and c2=$lc/2$ if the distances between the blade and the casing are negative for the trailing edge and the leading edge. There is therefore contact all along the cord.
- c1=$-lc/2$ and c2=$-\eta/\zeta$ if the distance between the blade and the casing is negative at the leading edge but positive at the trailing edge. There is therefore contact on a part of the cord of the blade, to the side of the leading edge.
- c1=$\eta/\zeta$ and c2=$lc/2$ if the distance between the blade and the casing is negative at the trailing edge but positive at the leading edge. There is therefore contact on part of the cord of the blade, to the side of the trailing edge.

In the formulas as presented, normal forces are proportional to penetration between solids and friction forces are achieved via Coulomb's law.

In this way forces and moments of reaction may be calculated at any point of the end of the blade in case of contact with the casing, without having to discretize the geometry of the blade or use simplified geometry not representative of the real geometry of the blade. Such a model considers the evolution of the distribution of the contact pressures on the cord. Contact may be initiated at one of the ends of the cord then the contact area may evolve until the blade touches the casing all along its cord. The steps described hereinabove calculate a realistic distribution of forces, given the evolution of the contact area.

During a dimensioning step E6, the results of calculations of the preceding steps are used to carry out dimensioning of the turbine engine.

According to a first example, the results of the first calculation step E3 are used to conduct contact detection. The results of such calculations for different speeds of rotation and supposing a certain imbalance of the turbine engine may be used to determine maximum shifts of the blade end during operation of the engine. All ranges of rotation speeds, for which the initial spacing at rest between the blade end and the casing is less than maximum calculated displacement, will present risk of contact between a blade and the casing of the turbine engine.

According to a second example, the results of calculations of forces and moments of reaction during the third calculation step E5 may be projected onto the degrees of freedom of the model to be introduced in the equation system describing the movements of the turbine engine. Resolution of this equation with contact may therefore determine the forces to be withstood by the turbine engine and the appearance of an unstable operating regime, potentially dangerous for the turbine engine.

The equation of movement with contact may be resolved several ways. Analysis of stability of the turbine engine may be conducted by supposing permanent contact of at least one blade with the casing of the turbine engine. The contact forces calculated during step E5 and projected onto the degrees of freedom of the model are linearized and applied permanently to an equation system describing movement of elements of the turbine engine. Analysis of stability may be conducted to predict for different rotation speeds whether introduction by perturbation may cause the appearance of an unstable operating regime, potentially dangerous for the turbine engine.

Finally, according to a third example, the results of calculations of distances, forces and moments obtained during the different preceding steps may be employed within a transient calculation to determine at each time step of the calculation the risk of contact between a blade and the casing and the associated forces and moments of reaction where needed.

Such calculation could be performed for example by the method of time integration so-called method of the central finite differences. In this way it is possible to perform calculation of a transient regime resulting from disturbance taking into account, at each instant of the transient, the possibility of contact and the reactions resulting from such contact. The evolution of the reaction forces during the transition determines the forces to be withstood by the turbine engine and any instability of the operating regime of the turbine engine resulting from the disturbance causing the transient.

If one of these analyzes reveals a risk unacceptable for the turbine engine, the operator performing such a method by means of the processing means may then modify a characteristic of the turbine engine to improve its dimensioning, to make it more resistant to perturbation for example. The operator may for example modify the geometric characteristics of the blades, the disc or the casing of the turbine engine, prohibit a certain range of speeds of rotation from having excessive risk of damage, modify the material used for one of the elements of the turbine engine so as to reduce the flexibility of this element . . . .

In this way, it is possible to optimally dimension a turbine engine, so as to limit the risks of damage in case of contact between the blades and the casing of the turbine engine, by minimizing the impact on its performance due to faithful modeling of the geometry and dynamics of the elements of the turbine engine, without increasing the number of computing resources consumed.

The device for dimensioning a turbine engine shown in FIG. 2 for performing the method for dimensioning comprises data-processing means 6 comprising:
  a module for acquiring the coordinates P of the ends of a leading edge BA and a trailing edge BF of a blade of a turbine engine in a reference mark linked to a disc of the turbine engine (Xb, Yb, Zb) determined previously, said turbine engine comprising a casing and said disc on which is fixed at least said blade, said casing enclosing the disc and the at least one blade, said disc being driven in rotation by a shaft about an axis, so-called axis of the turbine engine z;
  a module for expressing the coordinates P' of the ends of the leading edge and of the trailing edge of the blade in a reference mark linked to the casing ($x_c$, $y_c$, $z_c$) from said acquired coordinates;
  a module for calculating the distance g between the casing and the ends of the leading edge and of the trailing edge of the blade from the coordinates P' of the ends of the leading edge and of the trailing edge of the blade in the reference mark linked to the casing ($x_c$, $y_c$, $z_c$);
  a module for calculating the normal $p_N$ and tangential $p_T$ contact pressures between the blade and the casing along the end of the blade from the calculated distance g;
  a module for calculating the normal $F_N$ and tangential $F_T$ reaction forces and normal $M_N$ and tangential $M_T$ moments of reaction resulting from the contact between the blade and the casing from the calculated pressures;
  a module for dimensioning the turbine engine as a function of the calculated distances, pressures, forces and moments.

The invention claimed is:

1. A method for dimensioning a turbine engine comprising a casing and a disc on which is fixed at least one blade, said casing enclosing the disc and the at least one blade, said disc being driven in rotation by a shaft about an axis of the turbine engine, and said blade comprising a leading edge and a trailing edge, said method comprising performing by a data-processing means steps of:
  acquiring of coordinates (P) of ends of the leading edge and of the trailing edge of the blade in a previously determined reference mark linked to the disc;
  from said acquired coordinates determining coordinates of upper ends of the leading edge and of the trailing edge of the blade in a reference mark linked to the casing;
  calculating a distance between the casing and the ends of the leading edge and of the trailing edge of the blade from the coordinates (P') of the ends of the leading edge and of the trailing edge of the blade in the reference mark linked to the casing;
  calculating normal ($p_N$) and tangential ($p_T$) contact pressures between the blade and the casing along an end of the blade from the calculated distance;
  calculating normal ($F_N$) and tangential ($F_T$) reaction forces and normal ($M_N$) and tangential ($M_T$) moments of reaction resulting from a contact between the blade and the casing from the calculated pressures; and
  dimensioning the turbine engine as a function of the calculated distances, pressures, forces and moments.

2. The method according to claim 1, wherein the coordinates of the upper ends of the leading edge and of the trailing edge of the blade in the reference mark linked to the casing are determined as a function of degrees of freedom of the disc, the casing and the blade.

3. The method according to claim 2, wherein said degrees of freedom are from among translations and tilting movements of the disc and of the casing, deflection of the blade at its tip and radial deformation of the casing.

4. The method according to claim 2 or 3, wherein said degrees of freedom are from among:
  translations of the disc by a first length ($x_d(t)$) and a second length ($y_d(t)$) along two axes transverse to the axis of the turbine engine, the two transverse axes and the axis of the turbine engine defining a first reference mark linked to the shaft;
  tilting of the disc at a first angle ($\varphi_{yd}(t)$) around the first axis of the first reference mark linked to the shaft, a second reference mark being obtained by rotation of the first reference mark linked to the shaft of the first angle ($\varphi_{xd}(t)$) around the first axis of the first reference mark linked to the shaft;

tilting of the disc at a second angle ($\varphi_{yd}(t)$) around the second axis of the second reference mark, a third reference mark obtained by rotation of the second reference mark of the second angle ($\varphi_{yd}(t)$) around the second axis of the second reference mark;

angular positioning of the blade relative to the second axis of the third reference mark, said angular positioning corresponding to rotation at a third angle ($\alpha_j$) around the third axis of the third reference mark, the reference mark linked to the disc forming a fourth reference mark obtained by rotation of the third reference mark of the third angle ($\alpha_j$) around the third axis of the third reference mark;

deflection of the blade at its tip by a third length ($x_b(t)$) along a first axis of a fifth reference mark obtained by rotation of the fourth reference mark of a fourth angle ($\beta$) around the second axis of the fourth reference mark;

translations of the casing by a fourth length ($x_c(t)$) and by a fifth length ($y_c(t)$) along the two first axes of the first reference mark;

tilting of the casing by a fifth angle ($\varphi_{xc}(t)$) around the first axis of the first reference mark, a sixth reference mark being obtained by rotation of the first reference mark of the fifth angle ($\varphi_{xc}(t)$) around the first axis of the first reference mark;

tilting of the casing by a sixth angle ($\varphi_{yc}(t)$) around the second axis of the first reference mark, the reference mark linked to the casing being obtained by rotation of the sixth reference mark of the sixth angle ($\varphi_{yc}(t)$) around the second axis of the first reference mark; and radial deformation of the casing by a sixth length ($u(\alpha,t)$) relative to a radius of the casing (Rc).

5. The method according to claim 4, wherein the coordinates (P') of the upper ends of the leading edge and of the trailing edge of the blade expressed in the reference mark linked to the casing are determined by the following formula:

$$P' = P_{\phi_{y_c}} P_{\phi_{x_c}} \left( P^T_{\phi_{x_d}} P^T_{\phi_{y_d}} P^T_{\alpha_j} \left( P + P^T_\beta \begin{Bmatrix} x_b(t) \\ 0 \\ 0 \end{Bmatrix} \right) + \begin{Bmatrix} x_d(t) - x_c(t) \\ y_d(t) - y_c(t) \\ 0 \end{Bmatrix} \right)$$

With:

$P\varphi_{xd}$ a transformation matrix from the first reference mark to the second reference mark, $P\varphi_{yd}$ a transformation matrix from the second reference mark to the third reference mark, $P\varphi_{xc}$ a transformation matrix from the first reference mark to the sixth reference mark and $P\varphi_{yc}$ a transformation matrix from the sixth reference mark to the reference mark linked to the casing, P$\alpha$j a transformation matrix linked to an angular positioning of the blade on the disc, P$\beta$ a transformation matrix linked to an orientation of the deflection of the blade at its tip, and $$P_{\alpha_j} = \begin{bmatrix} \cos\alpha_j & \sin\alpha_j & 0 \\ -\sin\alpha_j & \cos\alpha_j & 0 \\ 0 & 0 & 1 \end{bmatrix}; P_\beta = \begin{bmatrix} \cos\beta & 0 & -\sin\beta \\ 0 & 1 & 0 \\ \sin\beta & 0 & \cos\beta \end{bmatrix}$$

$$P_{\phi_{x_d}} = \begin{bmatrix} 1 & 0 & 0 \\ 0 & \cos\phi_{x_d} & \sin\phi_{x_d} \\ 0 & -\sin\phi_{x_d} & \cos\phi_{x_d} \end{bmatrix}; P_{\phi_{y_d}} = \begin{bmatrix} \cos\phi_{y_d} & 0 & -\sin\phi_{y_d} \\ 0 & 1 & 0 \\ \sin\phi_{y_d} & 0 & \cos\phi_{y_d} \end{bmatrix}$$

$$P_{\phi_{x_c}} = \begin{bmatrix} 1 & 0 & 0 \\ 0 & \cos\phi_{x_c} & \sin\phi_{x_c} \\ 0 & -\sin\phi_{x_c} & \cos\phi_{x_c} \end{bmatrix}; P_{\phi_{y_c}} = \begin{bmatrix} \cos\phi_{y_c} & 0 & -\sin\phi_{y_c} \\ 0 & 1 & 0 \\ \sin\phi_{y_c} & 0 & \cos\phi_{y_c} \end{bmatrix}.$$

6. The method according to claim 5, wherein an internal surface of the casing being considered to form a circular cone of angle $\theta$, base radius Rb and height h, the distance g between the casing and the ends of the leading edge and of the trailing edge of the blade is calculated by means of the following formula:

$$g(P) = \left(-\frac{R_b}{h} P'_z + R_b - \sqrt{P'^2_x + P'^2_y} + u(\alpha(P), t)\right)\cos\theta$$

with $$P' = \{P'_x, P'_y, P'_z\}^T.$$

7. The method according to claim 1, wherein the calculating of pressures performs a shaping function adapted to the end of the blade and to a profile of initial clearance.

8. The method according to claim 1, wherein the contact pressures are calculated along a cord assumed to be rectilinear of length lc forming an end of the blade by a linear interpolation from the calculated distances between the casing and the upper ends of the leading edge and of the trailing edge of the blade.

9. The method according to claim 8, wherein the normal $p_N$ and tangential $p_T$ contact pressures at any point of said cord are calculated by means of the following formulas:

$$p_N(c) = \frac{k_r}{l_c}(\zeta c + \eta) \text{ and } p_T(c) = \frac{k_t}{l_c}(\zeta c + \eta)$$

$$avec\, \zeta = \frac{g(BF) - g(BA)}{l_c}$$

$$et\, \eta = \frac{g(BF) - g(BA)}{2}$$

c representing an abscissa of a position along said cord varying between $-lc/2$ and $+lc/2$ and, $k_r$ and $k_t$ being normal and tangential degrees of stiffness on contact.

10. The method according to claim 9, wherein the normal $F_N$ and tangential $F_T$ reaction forces and the normal $M_N$ and tangential $M_T$ moments of reaction resulting from the contact between a blade and the casing are calculated by means of the following formulas:

$$F_N = \int_{c1}^{c2} p_N(c)dc \quad F_T = \int_{c1}^{c2} p_T(c)dc \quad M_N = \int_{c1}^{c2} c\, p_N(c)dc$$
$$M_T = \int_{c1}^{c2} c\, p_N(c)dc$$

c1 and c2 being minimum and maximum abscissae of all the positions of the cord of the blade in contact with the casing.

11. A non-transitory computer program product comprising code instructions for executing a method for dimensioning, according to claim 1 when the code instructions are executed by a processor.

12. A device for dimensioning a turbine engine including a data-processing means comprising: a processor for acquiring coordinates (P) of ends of a leading edge and a trailing edge of a blade of a turbine engine in a reference mark linked to a disc of the turbine engine determined previously, said turbine engine comprising a casing and said disc on which is fixed at least said blade, said casing enclosing the disc and the blade, said disc being driven in rotation by a shaft about an axis of the turbine engine;

expressing coordinates (P') of upper ends of the leading edge and of the trailing edge of the blade in a reference mark linked to the casing from said acquired coordinates;

calculating distance between the casing and the ends of the leading edge and of the trailing edge of the blade from the coordinates (P') of the upper ends of the leading edge and of the trailing edge of the blade in the reference mark linked to the casing;

calculating normal ($p_N$) and tangential ($p_T$) contact pressures between the blade and the casing along the end of the blade from the calculated distance;

calculating normal ($F_N$) and tangential ($F_T$) reaction forces and normal ($M_N$) and tangential ($M_T$) moments of reaction resulting from a contact between the blade and the casing from the calculated pressures; and dimensioning the turbine engine as a function of the calculated distances, pressures, forces and moments.

\* \* \* \* \*